June 23, 1942.   F. W. FRAUMANN ET AL   2,287,677
TESTING INSTRUMENT FOR TOOTHED WHEELS
Filed Jan. 14, 1939   2 Sheets-Sheet 1

INVENTOR
Fred W. Fraumann
BY Harry E. Kitchen
Albert R. Henry
ATTORNEY

June 23, 1942.  F. W. FRAUMANN ET AL  2,287,677
TESTING INSTRUMENT FOR TOOTHED WHEELS
Filed Jan. 14, 1939   2 Sheets-Sheet 2
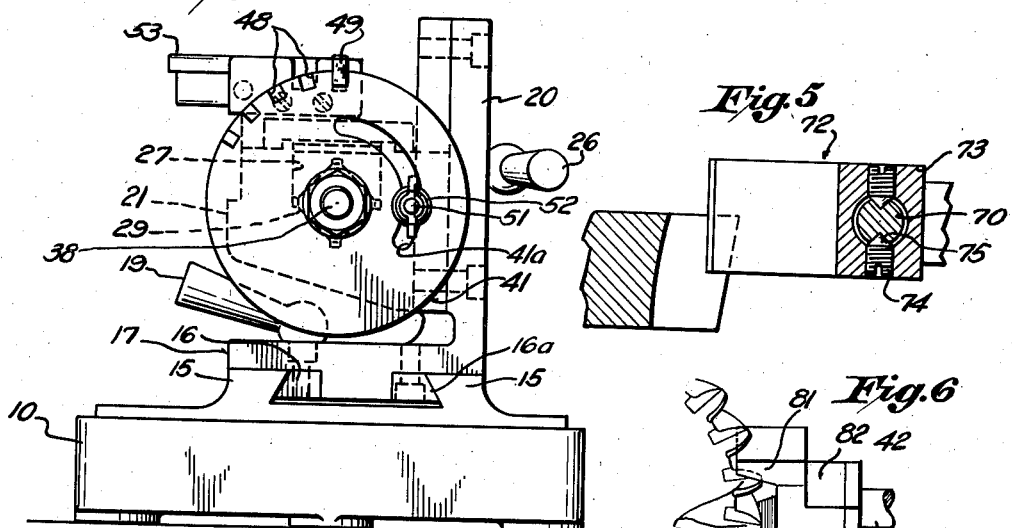
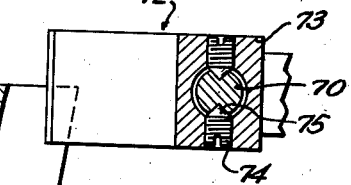
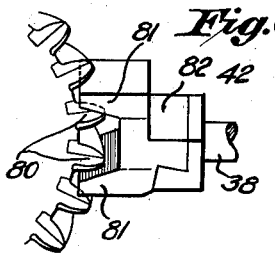
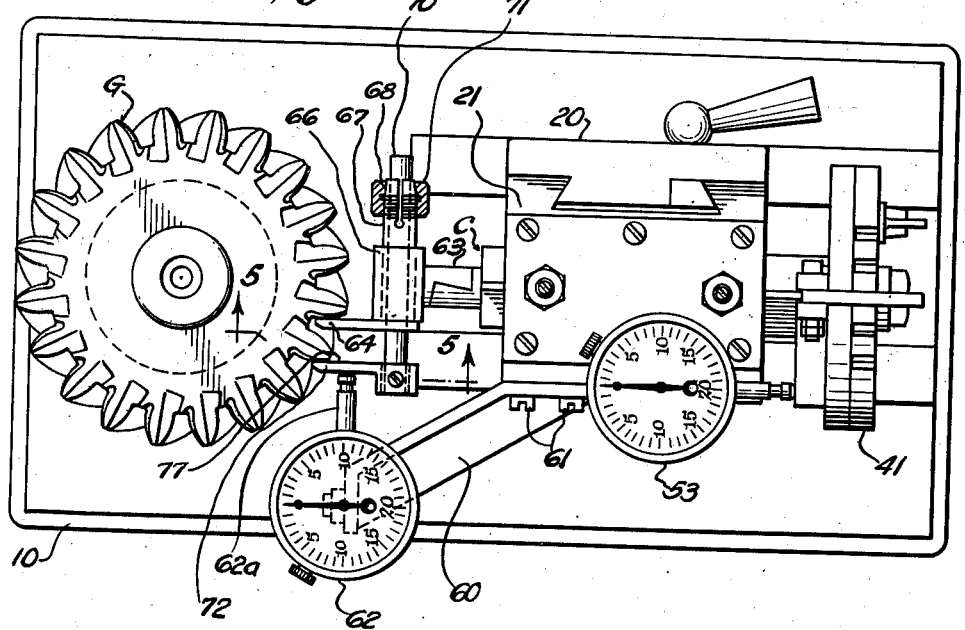
INVENTOR
Fred W. Fraumann
Harry E. Kitchen
BY Albert R. Henry
ATTORNEY Patented June 23, 1942

2,287,677

UNITED STATES PATENT OFFICE 2,287,677

TESTING INSTRUMENT FOR TOOTHED WHEELS

Fred W. Fraumann and Harry E. Kitchen, Buffalo, N. Y., assignors to Farrel-Birmingham Company, Inc., Buffalo, N. Y.

Application January 14, 1939, Serial No. 250,984

2 Claims. (Cl. 33—174)

This invention relates to apparatus for testing the accuracy of pinion type cutters, gears, and similar toothed devices.

The invention is particularly devised for testing the cutting edges of cutters of the helical type used in the production of continuous tooth herringbone gears. As is well known in the art, such gears are often formed by the shaping-generating process, in which a pair of cutters operating from opposite faces of the gear blank each cut helical gear formations of opposite hands, which formations are joined precisely at the median plane of the gear. The performance of such gears is dependent not only upon the degree of accuracy in tooth contour and regularity of the right and left hand groups of helical teeth, but upon an exacting similitude between the teeth of opposing groups.

This degree of accuracy is only obtainable when the right and left hand cutters are substantial duplicates in diametrical and tooth contour characteristics, and it is an object of this invention to provide a testing apparatus which may be used to measure and to compare directly a pair of such cutters. The apparatus is devised so that with a single setting it may gauge the cutting edges directly of right and left hand helical cutters, and reflect not only differences in comparative proportions of the edge profiles, but individual errors in each cutter such as those of eccentricity or faulty tooth spacing. Cutters of this type are repeatedly resharpened by grinding, and in each instance the testing apparatus may be used as a guide for the grinding operation to indicate the necessity of minute corrections.

The apparatus is so devised that the testing procedure, in its several phases, may be performed with considerable speed and with a minimum probability of error, as more fully set forth in the accompanying specification and drawings, wherein:

Fig. 3 is an end view thereof;

Fig. 4 is a top view showing a tooth division checking fixture applied to the testing head;

Fig. 5 is an enlarged section on the line 5—5 of Fig. 4;

Fig. 6 is a fragmentary view showing another embodiment of the test block.

Figure 1:
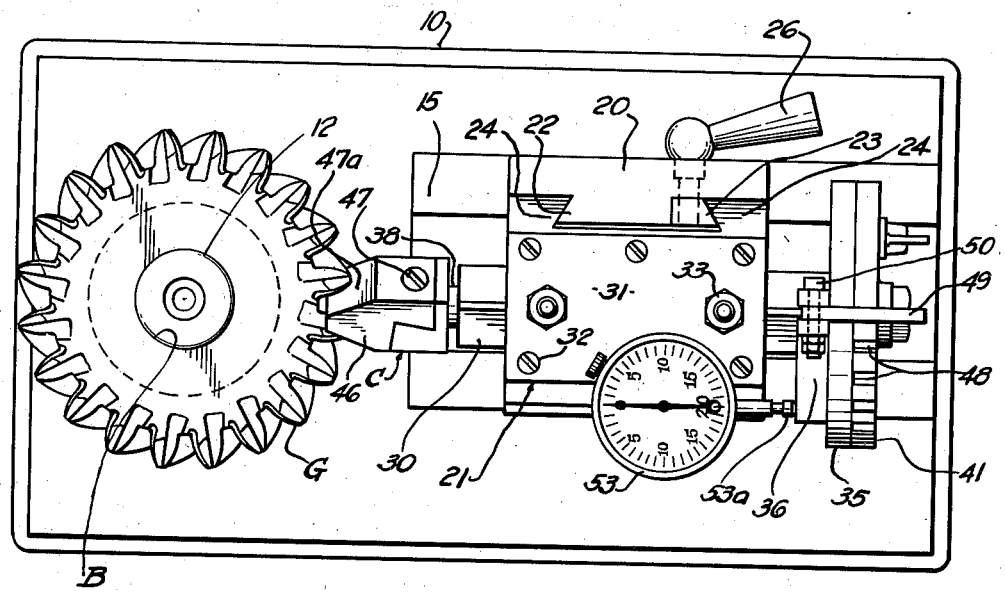
Fig. 1 is a top view of the device showing a helical cutter positioned for testing.
Figure 2:
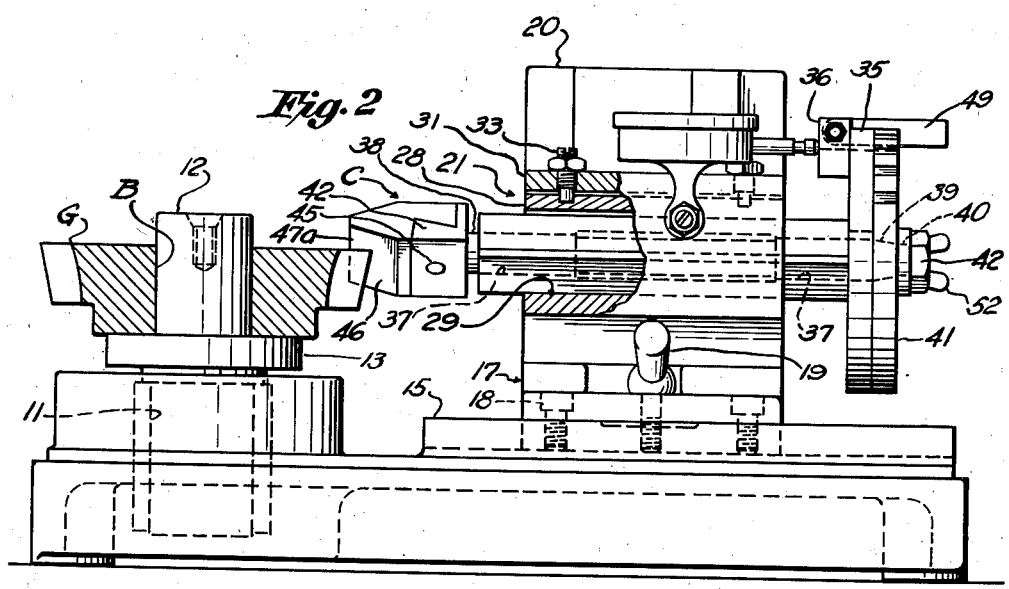
Fig. 2 is a side view thereof with the cutter shown in section.

The testing instrument includes a base 10 having an accurately ground vertical bearing 11 at one extremity which serves to receive a shaft 12. The shaft is formed with a central flange 13 which rests on the bearing 11 and which also serves as a support for the cutter C, or like toothed device undergoing testing operations. It will be initially observed that the cutter is thus positioned for testing with its bore B as a surface of reference.

The top of the base is formed with horizontal ways 15 which slidably receive the gibs 16, 16a of a head 17. One gib 16 is secured from above by screws 18 and handscrew 19, which screws may be drawn up to lock the head in any desired longitudinal position. The head 17 is formed with an integral vertical bracket portion 20 which carries a vertically adjustable saddle 21, the bracket portion 20 having gibs 22, 23, and the saddle having complementary slides 24. One gib 23 of the bracket is a loose member which is secured by a handscrew 26 for locking the saddle in various vertical positions.

The saddle is slotted, as indicated at 27, to receive a bushing 28, which, together with the adjoining portion of the saddle, is formed as a composite bearing 29 of square cross-section. A cover plate 31 is secured to the upper surface of the saddle by screws 32, and it carries adjusting screws 33 for rigidly holding the underlying bushing in position.

A test carriage C is carried by the saddle 21, and it includes a square spindle which is slidably mounted in the bearing 29. The rear projecting portion of the spindle is formed with a large flange 35 having a bifurcated lug 36 secured to its upper end. The spindle is axially bored to provide bearings 37 for receiving rotatably a shaft 38. Both extremities of the shaft project from the spindle 34, the right hand end being tapered and threaded as indicated by the numerals 39 and 40 to receive an anchor plate 41 and a clamping nut 42 for rigidly securing the plate to the shaft. The opposite extremity of the shaft 38 is formed with an angular head 44 containing a tapped hole 45. A test block 46 is formed to fit the head 44, and it is secured thereto by a screw 47. It will be observed that the block is formed with a terminal 47a of rack profile, so that it may engage between adjacent teeth of the cutter.

Indexing notches 48 are formed in the anchor plate 41, while the lug 36 of the spindle flange 35 receives an index finger 49, which is pivoted, as indicated by the numeral 50, to enter one of the notches 48. The flange 35 additionally carries a threaded stud 51 which projects through an arcuate slot 41a in the plate 41 to provide for clamping together of the plates by a wing nut 52.

A gauge 53 of the dial type is secured to the saddle 21 in such position that its anvil 53a extends horizontally rearward, where it is adapted to be engaged by a portion of the carriage C, such as the lug 36, during forward sliding movement of such assembly.

In the testing of pinion type cutters, it will be appreciated that only the actual cutting edges need be considered, as the remainder of each tooth is tapered from the cutting edges to provide tool relief and thus has no cutting function. It will therefore be apparent that when the cutter is of the helical type, as shown, the test block 46 must necessarily be disposed at an angle so that the opposing surfaces of its rack terminal 46a are in engagement with the cutting edges of adjacent teeth. The block is therefore first set to the desired gauging angle by engaging the index finger 49 in the proper notch in the anchor plate 41, and the components of the carriage C are then clamped by tightening the wing nut 52 so that the carriage may be slid backward or forward as a rigid unit in its square bearing 29.

During the testing operation, the carriage C is moved forward to cause the firm engagement of the testing block with the flank edges of a pair of teeth of the cutter. The anvil of the gauge 53 is engaged and depressed during this procedure to cause an indication on the gauge. This indication is cancelled by setting the gauge hand to a zero reading, which reading is used as a basis of comparison for tests on the remaining teeth. The carriage is then slid rearward to disengage the cutter teeth, and the cutter is then rotated to present the next tooth gap to the test block, which is brought into contact as before. The reading on the gauge, which may be either plus or minus the original zero value, is noted and cataloged, and the operation is continued until each tooth gap is tested.

The companion cutter (not shown), which is to be compared or "paired" with the cutter C, is a duplicate of the cutter C, with the exception that the teeth are of opposite hand, as is well known in the art. This cutter, when positioned on the vertical shaft 12, presents teeth of an opposed helix angle to the test block 46, which is accordingly reset by rotating the anchor plate 41 and locating the index finger 49 in the proper notch. The notches are located so that the block 46 may thus be moved from the angular position of Fig. 1 to a symmetrical and opposing angular position relative to the vertical axis of the device.

The new cutter is then tested without altering the previous setting of the gauge, and the dial readings obtained provide a direct comparison of the diametral characteristics of both cutters. In the event the gauge readings reflect that one cutter is oversize outside the desired tolerances, it is re-sharpened and re-tested until it is a practical duplicate of its companion.

Aside from the comparative feature of the tests, the test of each cutter indicates individual errors such as eccentricity of the teeth in relation to the bore B and non-uniformity of profile. In its latter aspect, it will be appreciated that the engagement of opposing edges of adjacent teeth by the test block 46 gives a dial reading which may be a summation of the characteristics of both edges. Thus, if a wide range of variation is observed, the operator may instantly locate a faulty tooth or an eccentric condition, and return the cutter for possible correction. By this means only cutters of uniform characteristics are accepted for pairing, thus assuring the production by such cutters of herringbone gears having uniform tooth contours and perfectly matched right and left hand helices.

The horizontal adjustment of the head 17 and the vertical adjustment of the testing saddle 21 provides means for positioning the carriage C for testing cutters of various diameters and face width, while the notches in the angle plate permit angular adjustment of the test block to the several standard helix angles.

In Figs. 4 and 5 a division checking attachment A is shown applied for use in conjunction with the described device. The attachment consists of a bracket 60, secured by screws 61 to the front of the saddle 21, and carrying a dial gauge 62, whose anvil 62a is disposed laterally. The described test block 46 is removed for this test, and a bracket member 63 substituted therefor. This member is formed with a rigid projecting jaw 64 which is properly located to engage tangentially one tooth edge, and it is also formed with a transverse bearing 66 terminating in a split and threaded clamping barrel 67 having a tapered extremity 68. A rod 70 is received in the bearing 66 and it may be locked in any desired axial position therein by a clamping nut 71 which engages over the threaded extremity of the barrel 67.

A second jaw 72 is formed with a hub 73 which is bored to encircle loosely the rod 70, and it is provided with opposed pivot screws 74 which engage in conical bearing seats 75 in the rod (Fig. 5). The jaw 72 is thus mounted for an arcuate or vane-like movement on the rod, and it is formed with a surface 77 which is adapted to engage tangentially the corresponding flank edge of an adjacent tooth.

It will be understood that the test performed with the aid of the attachment of Fig. 4 is supplemental to the first described tests. In other words, when a cutter has satisfactorily passed the first rigid test, there is still a possibility of error which may evade the first test as the result of a coincidence of errors, or compensating errors on opposing flank profiles. The attachment provides against this condition by checking the regularity of adjacent teeth on common flanks.

In the operation of the attachment, the carriage assembly is operated as before to bring the fixed jaw 64 into contact with a flank edge with, however, the difference that the forward movement is manually controlled until a zero reading is obtained on the first dial gauge 53. The jaw 72, in the meantime, being under spring pressure of the anvil 62a of the attachment gauge 62, is maintained against the flank edge of the adjoining tooth. This gauge is also set to a zero reading and the test proceeds tooth by tooth in an attempt to discern appreciable errors of spacing.

The testing device will be found to be equally effective in use on straight tooth cutters, especially those which require comparative accuracy, such as multiple or gang cutters. For such use, the testing block 46 is retained throughout the tests in a true vertical position. For testing gears, the same apparatus may be used, in which instance the test block or blocks engage flank surfaces rather than flank edges as in the cutters.

It will be understood from the foregoing description that different modifications and arrangements of the test blocks may be made, depending upon the type of toothed device being tested. In fine pitch cutters or gears, for example, the block 46 may be made to straddle several teeth, if desired. In Fig. 6 two teeth 80 of the cutter are straddled by the tines 81 of a test block 82.

The invention is therefore not to be considered as limited to the precise arrangements of the drawings, but is to be construed in the light of the following claims.

We claim:

1. A testing device for pairing helical cutters of the pinion type wherein the cutting edges lie in a substantially common plane adjacent one face surface of the cutter, comprising means axially supporting a cutter for free rotary movement, a carriage, means supporting the carriage for sliding movement lateral to the cutter axis, a member rotatably carried by the carriage on an axis perpendicular to the cutter axis at the zone of the cutting edges of the cutter, means for selectively positioning the block in symmetrical angular positions with reference to a plane normal to the axis of the cutter, comprising a test block secured to said member and extending toward said cutter axis, a notched anchor wheel secured to said member, means securing the anchor wheel to the carriage including an index finger on the carriage engageable in one of the notches of the anchor wheel, and indicating means operated by and during movement of said carriage.

2. A testing device for pairing helical cutters of the pinion type wherein the cutting edges lie in a substantially common plane adjacent one face surface of the cutter, comprising a base, a shaft carried by the base and adapted to support a cutter for free rotary movement, a head adjustably carried on said base, a saddle mounted on the head for lineal adjustment parallel to the shaft axis, a carriage slidably carried by the saddle for movement lateral to the cutter axis, a shaft having a test block and a notched anchor wheel secured thereto, bearing means on the saddle for mounting the shaft for rotary adjustment, means securing the anchor wheel to the carriage including an index finger on the carriage engageable in one of the notches of the anchor wheel, said head being adjustable to position the test block in the zone of the cutting edges of the cutter teeth, indexing means for rigidly holding the cutter in position during each tooth testing operation wherein the carriage is moved to cause the block to engage the cutting edges of a tooth gap of the cutter, and indicating means operated by and during movement of the carriage.

FRED WM. FRAUMANN.
HARRY E. KITCHEN.